United States Patent
Ghislini et al.

(10) Patent No.: US 8,059,202 B2
(45) Date of Patent: Nov. 15, 2011

(54) METHOD FOR CONTROLLING ELECTRONIC APPARATUS

(75) Inventors: Claudio Ghislini, Zurich (CH); Magdy Megeid, Zurich (CH)

(73) Assignee: Thomson Licensing, Boulogne-Billancourt (FR)

( * ) Notice: Subject to any disclaimer, the term of this patent is extended or adjusted under 35 U.S.C. 154(b) by 1292 days.

(21) Appl. No.: 11/661,947

(22) PCT Filed: Aug. 26, 2005

(86) PCT No.: PCT/IB2005/002542
§ 371 (c)(1),
(2), (4) Date: Mar. 2, 2007

(87) PCT Pub. No.: WO2006/024919
PCT Pub. Date: Mar. 9, 2006

(65) Prior Publication Data
US 2008/0094514 A1    Apr. 24, 2008

Related U.S. Application Data

(60) Provisional application No. 60/607,016, filed on Sep. 3, 2004.

(51) Int. Cl.
*H04N 5/50* (2006.01)
*H04N 5/445* (2011.01)
*H04N 7/10* (2006.01)
(52) U.S. Cl. ............... 348/564; 348/569; 725/38
(58) Field of Classification Search .......... 348/564, 348/569, 555, 553, 734, 565, 588; 725/38–40, 725/43, 44, 50; 345/619; 715/243, 705, 715/719, 764, 765, 808, 817, 828, 829, 840, 715/841
See application file for complete search history.

(56) References Cited

U.S. PATENT DOCUMENTS

| 5,528,304 | A  * | 6/1996 | Cherrick et al. ............. 725/41 |
| 5,767,919 | A  * | 6/1998 | Lee et al. ................. 725/37 |
| 6,373,450 | B1 | 4/2002 | Fujita |
| 6,753,928 | B1 * | 6/2004 | Gospel et al. ............ 348/569 |
| 6,934,917 | B2 * | 8/2005 | Lin ..................... 715/811 |

(Continued)

FOREIGN PATENT DOCUMENTS

EP    0575956    12/1993
(Continued)

OTHER PUBLICATIONS

Patent Abstracts of Japan, vol. 1997, No. 07, Jul. 31, 1997 and JP 9-083302 (Matsushita Electric Ind. Co. Ltd.).

(Continued)

*Primary Examiner* — Victor Kostak
(74) *Attorney, Agent, or Firm* — Robert D. Shedd; Joseph J. Opalach; Reitseng Lin

(57) ABSTRACT

A method is provided for enabling users to control an electronic apparatus such as a television signal receiver, multimedia device, and/or other device in an easy and convenient manner using a single key of a user input device. According to an exemplary embodiment, the method includes steps of enabling each of the plurality of modes to be displayed for a first time period in response to a first occurrence of a control signal, enabling one of the modes currently being displayed to be selected in response to a second occurrence of the control signal, and enabling each of a plurality of options associated with the selected mode to be displayed for a second time period in response to the second occurrence of the control signal.

27 Claims, 5 Drawing Sheets

U.S. PATENT DOCUMENTS

| | | | |
|---|---|---|---|
| 7,152,236 B1 * | 12/2006 | Wugofski et al. | 725/40 |
| 7,453,520 B2 * | 11/2008 | Kim | 348/553 |
| 2002/0171763 A1 * | 11/2002 | Stecyk et al. | 348/552 |
| 2003/0018972 A1 * | 1/2003 | Arora | 725/47 |
| 2003/0070170 A1 | 4/2003 | Lennon | |
| 2003/0132971 A1 | 7/2003 | Billmaier et al. | |
| 2003/0210353 A1 | 11/2003 | Jeong et al. | |

FOREIGN PATENT DOCUMENTS

| | | |
|---|---|---|
| JP | 6-149517 | 5/1994 |
| JP | 8-83141 | 3/1996 |
| JP | 9-083302 | 3/1997 |
| JP | 9-114624 | 5/1997 |
| JP | 2001-333291 | 11/2001 |
| WO | WO 96/19074 | 6/1996 |
| WO | WO 03/021915 | 3/2003 |
| WO | WO 03/021948 | 3/2003 |
| WO | WO 03/021949 | 3/2003 |

OTHER PUBLICATIONS

Search Report Dated Nov. 24, 2005.

* cited by examiner

METHOD FOR CONTROLLING ELECTRONIC APPARATUS

CROSS REFERENCE TO RELATED APPLICATION

This application claims the benefit, under 35 U.S.C. §365 of International Application PCT/IB2005/002542, filed Aug. 26, 2005, which was published in accordance with PCT Article 21(2) on Mar. 9, 2006 in English and which claims the benefit of U.S. provisional patent application No. 60/607,016, filed Sep. 3, 2004.

BACKGROUND OF THE INVENTION

1. Field of the Invention

The present invention generally relates to control techniques for an electronic apparatus such as a television signal receiver, multimedia device, and/or other device, and more particularly, to a method for enabling users to control such an electronic apparatus in an easy and convenient manner using a single key of a user input device.

2. Background Information

Electronic apparatuses such as television signal receivers, multimedia devices, and/or other devices are often controlled by user input devices, such as hand-held remote control devices or other data entry devices/elements. Such user input devices typically include a keypad/keyboard having a relatively large number of keys to accommodate the various functions capable of being performed by the electronic apparatus. At a minimum, such user input devices usually include at least ten keys (e.g., for digits 0 to 9). Some user input devices may, for example, include specific keys that are dedicated to controlling certain functions.

With the aforementioned types of user input devices, it may be difficult for users to control an electronic apparatus, particularly in certain environments. For example, it may be difficult for users to control an electronic apparatus with such user input devices in a dark room or at night, without first turning on a light. Moreover, even with adequate lighting, users may be required to look directly at the keypad/keyboard of the user input device in order to provide an input. These prerequisites for operating a user input device may, for example, be particularly annoying and inconvenient for users watching television.

Accordingly, there is a need for a method for enabling users to control an electronic apparatus such as a television signal receiver, multimedia device, and/or other device that avoids the foregoing problems, and thereby enables users to control various functions of an electronic apparatus in an easy and convenient manner using a single key of a user input device. The present invention addresses these and/or other issues.

SUMMARY OF THE INVENTION

In accordance with an aspect of the present invention, a method for controlling an electronic apparatus having a plurality of modes is disclosed. According to an exemplary embodiment, the method comprises enabling each of the plurality of modes to be displayed for a first time period in response to a first occurrence of a control signal, enabling one of the modes currently being displayed to be selected in response to a second occurrence of the control signal, and enabling each of a plurality of options associated with the selected mode to be displayed for a second time period in response to the second occurrence of the control signal.

In accordance with another aspect of the present invention, an electronic apparatus is disclosed. According to an exemplary embodiment, the electronic apparatus comprises memory means for storing data associated with a plurality of modes. Processing means enable each of the plurality of modes to be displayed for a first time period in response to a first occurrence of a control signal. The processing means enables one of the modes currently being displayed to be selected in response to a second occurrence of the control signal. The processing means further enables each of a plurality of options associated with the selected mode to be displayed for a second time period in response to the second occurrence of said control signal.

In accordance with another aspect of the present invention, a television signal receiver is disclosed. According to an exemplary embodiment, the television signal receiver comprises a memory operative to store data associated with a plurality of modes. A processor is operatively coupled to the memory and enables each of the plurality of modes to be displayed for a first time period in response to a first occurrence of a control signal. The processor enables one of the modes currently being displayed to be selected in response to a second occurrence of the control signal. The processor further enables each of a plurality of options associated with the selected mode to be displayed for a second time period in response to the second occurrence of the control signal.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
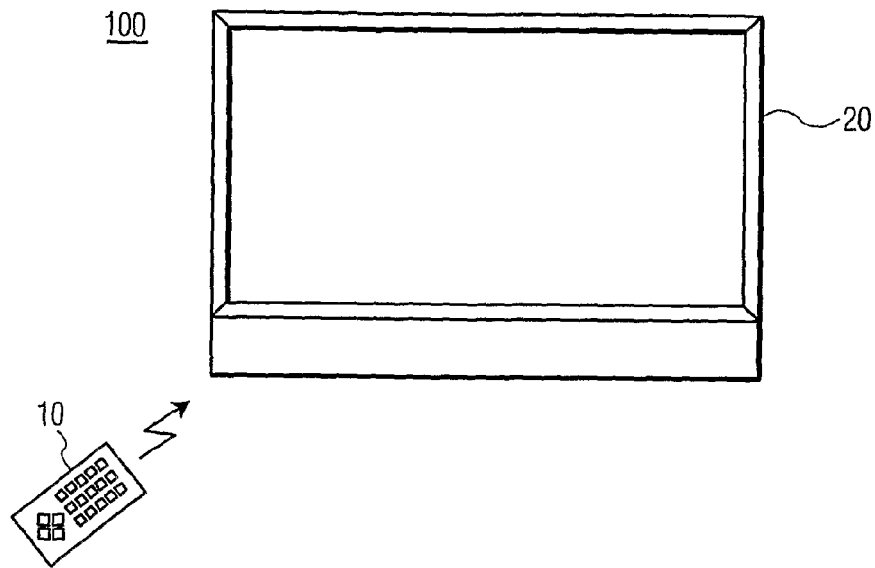
FIG. 1 is an exemplary environment suitable for implementing the present invention.

Referring now to the drawings, and more particularly to FIG. 1, an exemplary environment 100 suitable for implementing the present invention is shown. As indicated in FIG. 1, environment 100 comprises user input means such as user input device 10, and an electronic apparatus 20. According to an exemplary embodiment, electronic apparatus 20 is embodied as a television signal receiver, but may be embodied as any device or apparatus capable of being controlling via user inputs.

User input device 10 is operative to generate and output control signals that control the operation of electronic apparatus 20 and/or other devices. According to an exemplary embodiment, user input device 10 includes a plurality of input keys and outputs control signals in a wired and/or wireless (e.g., via infrared or radio frequency (RF) link, etc.) manner responsive to user depression of its input keys. User input device 10 may for example be embodied as a hand-held remote control device, wired and/or wireless keyboard, integrated control panel of electronic apparatus 20, and/or other user input device.

Electronic apparatus 20 is operative to receive signals including audio, video and/or data signals in analog and/or digital format from one or more signal sources such as terrestrial, cable, satellite, internet and/or other signal sources and to provide aural and/or visual outputs corresponding to these received signals. Electronic apparatus 20 is also operative to process received signals and provide the resulting processed signals to one or more other devices, and to receive signals from other devices. According to the present invention, various functions of electronic apparatus 20 including, but not limited to, volume selection, channel selection, and input selection can be controlled by users with only a single key of user input device 10. Further details regarding these aspects of electronic apparatus 20 will be provided later herein.

Figure 2:
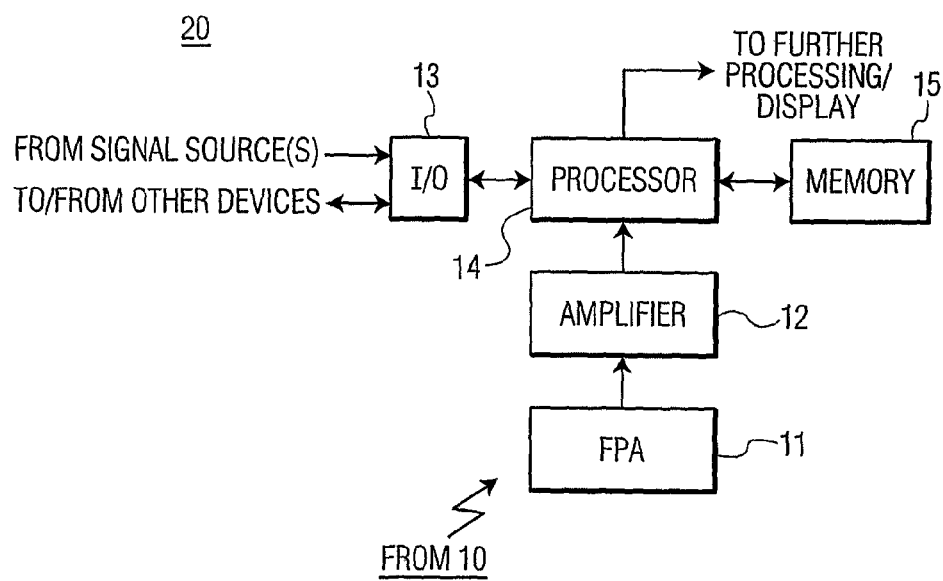
FIG. 2 is a block diagram providing further details of the electronic apparatus of FIG. 1 according to an exemplary embodiment of the present invention.

Referring to FIG. 2, a block diagram providing further details of electronic apparatus 20 of FIG. 1 according to an exemplary embodiment of the present invention is shown. Electronic apparatus 20 of FIG. 2 comprises front panel means such as front panel assembly (FPA) 11, coupling means such as amplifier 12, and input/output (I/O) means such as I/O block 13, processing means such as processor 14, and memory means such as memory 15. Some of the foregoing elements of FIG. 2 may be embodied using ICs, and some elements may for example be included on one or more ICs. For clarity of description, certain conventional elements associated with electronic apparatus 20 such as certain control signals, power signals and/or other elements may not be shown in FIG. 2.

FPA 11 is operative to receive user inputs from user input device 10, and to output signals corresponding to the user inputs to amplifier 12. According to an exemplary embodiment, FPA 11 receives signals, such as IR and/or RF signals, from user input device 10 and generates corresponding signals which are output to amplifier 12. Amplifier 12 is operative to amplify the signals provided from FPA 11 for output to processor 14.

I/O block 13 is operative to perform I/O functions of electronic apparatus 20. According to an exemplary embodiment, I/O block 13 is operative to receive signals such as audio, video and/or data signals in analog and/or digital format from one or more signal sources such as terrestrial, cable, satellite, internet and/or other signal sources. I/O block 13 is also operative to output processed signals to one or more other devices, and to receive signals from such devices.

Processor 14 is operative to perform various signal processing and control functions of electronic apparatus 20. According to an exemplary embodiment, processor 14 processes the audio, video and/or data signals provided from I/O block 13 by performing functions including tuning, demodulation, forward error correction, and transport processing functions to thereby generate digital data representing audio, video and/or data content. The digital data produced from such processing functions may be provided for further processing and/or output.

Processor 14 is also operative to execute software code to enable user control of electronic apparatus 20 using only a single key of user input device 10. According to an exemplary embodiment, processor 14 enables each of a plurality of modes of electronic apparatus 20 to be displayed for a predetermined time period in response to a first occurrence of a control signal. This control signal is generated in response to a user pressing a predetermined key of user input device 10. According to this exemplary embodiment, the modes include a volume selection mode, a channel selection mode, and an input selection mode. Processor 14 enables one of the modes currently being displayed to be selected by the user in response to a second occurrence of the control signal. Processor 14 also enables each of a plurality of options associated with the selected mode to be displayed for a predetermined time period in response to the second occurrence of the control signal. In this manner, users may easily and conveniently control electronic apparatus 20 using only a single key of user input device 10. Processor 14 is also operative to perform and/or enable other functions of electronic apparatus 20 including, but not limited to, processing other user inputs made via user input device 10, reading and writing data from and to memory 15, and/or other operations.

Memory 15 is operatively coupled to processor 14 and performs data storage functions of electronic apparatus 20. According to an exemplary embodiment, memory 15 stores data including, but not limited to, software code, on-screen display data including mode and option lists, user setup data, and/or other data.

Figure 3:
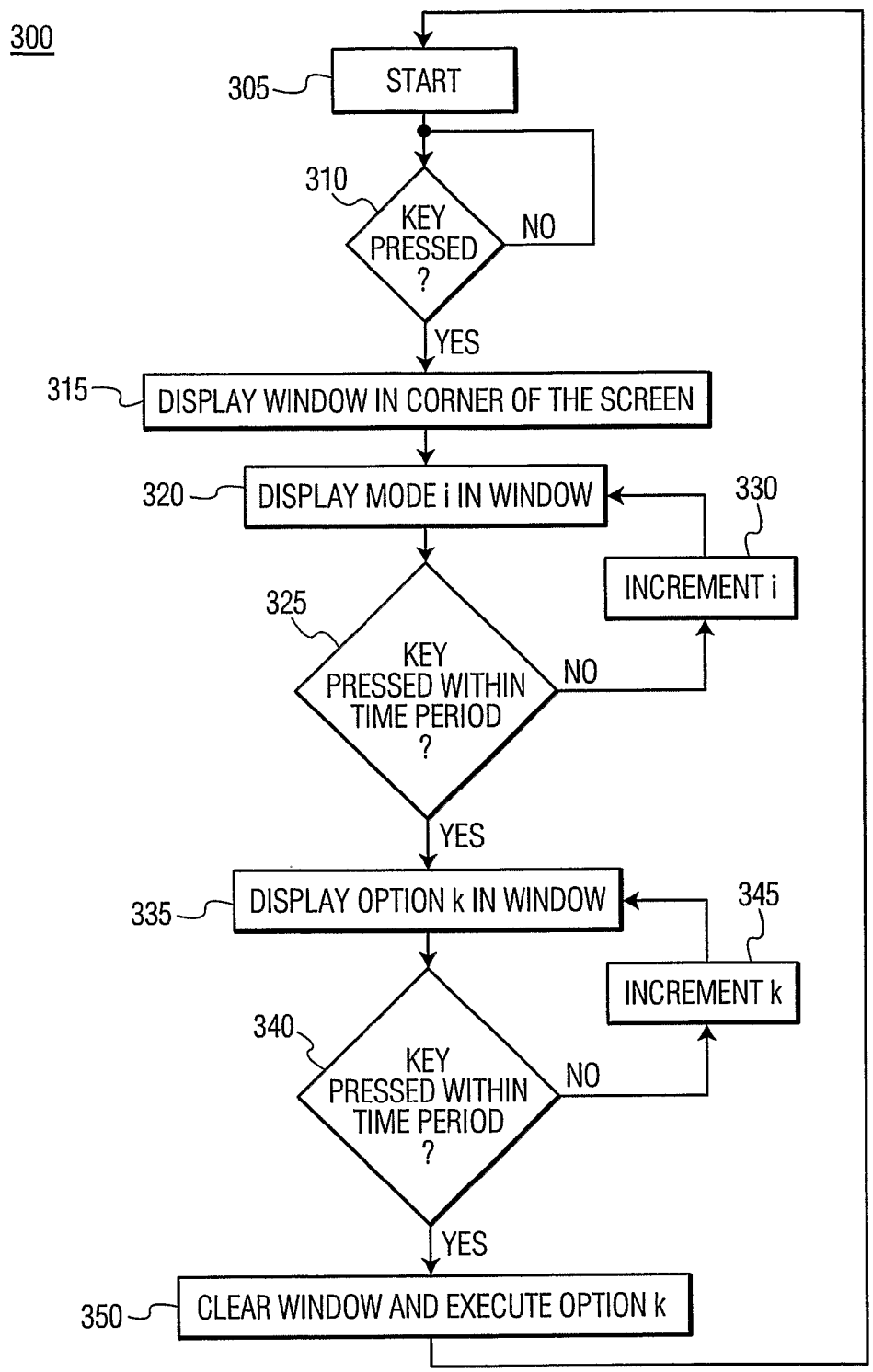
FIG. 3 is a flowchart illustrating steps for controlling an electronic apparatus according to an exemplary embodiment of the present invention.

Referring to FIG. 3, a flowchart 300 illustrating steps for controlling an electronic apparatus according to an exemplary embodiment of the present invention is shown. For purposes of example and explanation, the steps of FIG. 3 will be described with reference to the elements of environment 100 shown in FIGS. 1 and 2. The steps of FIG. 3 are merely exemplary, and are not intended to limit the present invention in any manner.

At step 305, the process starts. At step 310, a determination is made as to whether a predetermined key of user input device 10 is pressed. According to an exemplary embodiment, the predetermined key may be any designated key of user input device 10, and processor 14 detects when this predetermined key is pressed at step 310. As indicated in FIG. 3, step 310 is repeated until processor 14 detects that the predetermined key of user input device 10 has been pressed.

Once processor 14 detects that the predetermined key has been pressed at step 310, process flow advances to step 315 where processor 14 enables a window to be displayed in a corner of the screen that provides a display for electronic apparatus 20. This screen may be integrated with electronic apparatus 20, or be a separate non-integrated display device. Also at step 315, processor 14 sets a counter variable "i" to a predetermined initial value (e.g., 1). As will be described herein, memory 15 stores a list of modes in which each mode has a particular "i" value. According to an exemplary embodiment, these modes include a volume selection mode, a channel selection mode, and an input selection mode, although other modes may also be included according to the present invention. Memory 15 also stores a list of options associated with each mode in which each option has a particular "k" value, where "k" is another counter variable.

At step 320, processor 14 reads the mode corresponding to the current "i" value from memory 15 and enables this mode to be displayed in the window in the corner of the screen. While the mode corresponding to the current "i" value is displayed in the window in the corner of the screen, processor 14 then detects at step 325 if the predetermined key of user input device 10 (i.e., the same key that was pressed at step 310) is pressed within a predetermined time period. According to an exemplary embodiment, the predetermined time period used at step 325 may be between 500 and 1000 milliseconds, although other time periods may also be used according to the present invention.

If the predetermined key is not pressed within the predetermined time period at step 325, process flow advances to step 330 where counter variable "i" is incremented by one (i.e., i=i+1). Process flow then loops back to step 320 where processor 14 reads the mode corresponding to the incremented "i" value from memory 15 and enables this mode to be displayed in the window in the corner of the screen.

Steps 320 to 330 may be repeated in the manner described above until the predetermined key of user input device 10 is pressed within the predetermined time period at step 325. It is noted that counter variable "i" has a maximum value which corresponds to the last mode in the list stored in memory 15. Accordingly, as steps 320 to 330 are repeated, if "i" is incremented at step 330 such that it exceeds this maximum value, processor 14 resets "i" to its predetermined initial value (e.g., 1) at step 330. In this manner, the various different modes of electronic apparatus 20 may be displayed in a predetermined sequence, and then repeated as steps 320 to 330 are repeated.

Figure 4:
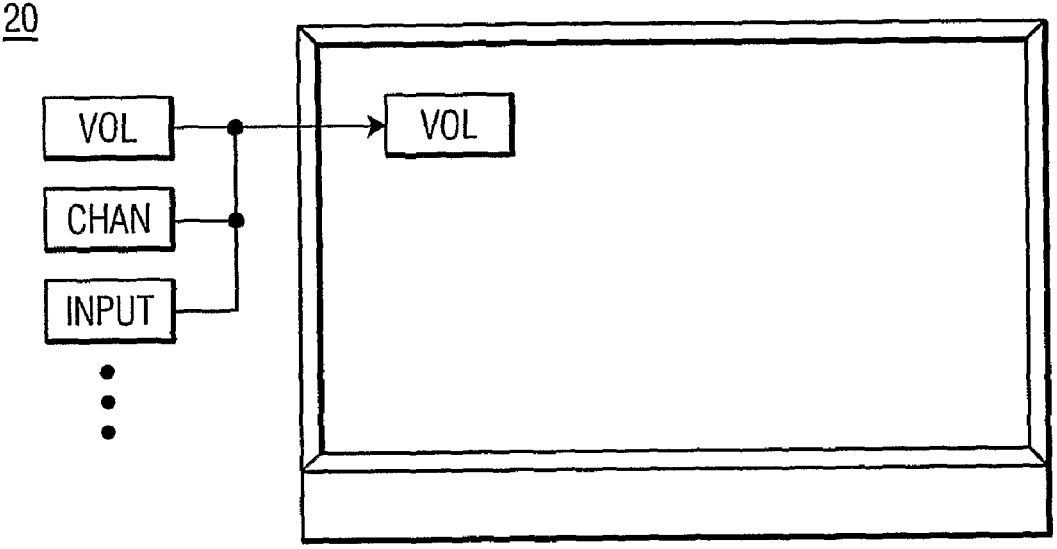
FIG. 4 is a diagram illustrating how different modes may be displayed according to an exemplary embodiment of the present invention.

FIG. 4 is a diagram illustrating how different modes may be displayed according to an exemplary embodiment of the present invention. As indicated in FIG. 4, a first mode such as the volume selection mode may be displayed the first time step 320 is performed. Similarly, a second mode such as the channel selection mode may be displayed the second time step 320 is performed, a third mode such as the input selection mode may be displayed the third time step 320 is performed, and so on. The modes may also be repeated in this sequence each time counter variable "i" is reset to its predetermined initial value at step 330. It is again noted that the modes shown in FIG. 4 are examples only, and other modes may also be included according to the present invention.

Once the predetermined key of user input device 10 is pressed within the predetermined time period at step 325, the mode currently being displayed in the window is deemed to be selected by a user, and processor 14 sets counter variable "k" for the selected mode to a predetermined initial value (e.g., 1). As previously indicated herein, memory 15 stores a list of options associated with each mode in which each option has a particular "k" value.

Following the positive determination at step 325, process flow then advances to step 335 where processor 14 reads the option corresponding to the current "k" value for the selected mode from memory 15 and enables this option to be displayed in the window in the corner of the screen. While the option corresponding to the current "k" value is displayed in the window in the corner of the screen, processor 14 then detects at step 340 if the predetermined key of user input device 10 (i.e., the same key that was pressed at steps 310 and 325) is pressed within a predetermined time period. According to an exemplary embodiment, the predetermined time period used at step 340 may be the same as the time period used at step 325 (e.g., between 500 and 1000 milliseconds), although other time periods may also be used according to the present invention.

If the predetermined key is not pressed within the predetermined time period at step 340, process flow advances to step 345 where counter variable "k" is incremented by one (i.e., k=k+1). Process flow then loops back to step 335 where processor 14 reads the mode corresponding to the incremented "k" value from memory 15 and enables this option to be displayed in the window in the corner of the screen.

Steps 335 to 345 may be repeated in the manner described above until the predetermined key of user input device 10 is pressed within the predetermined time period at step 340. It is noted that counter variable "k" also has a maximum value which corresponds to the last option for the selected mode in the list stored in memory 15. Accordingly, as steps 335 to 345 are repeated, if "k" is incremented at step 345 such that it exceeds this maximum value, processor 14 resets "k" to its predetermined initial value (e.g., 1) at step 345. In this manner, the various different options for the selected mode of electronic apparatus 20 may be displayed in a predetermined sequence, and then repeated as steps 335 to 345 are repeated.

Figure 5:
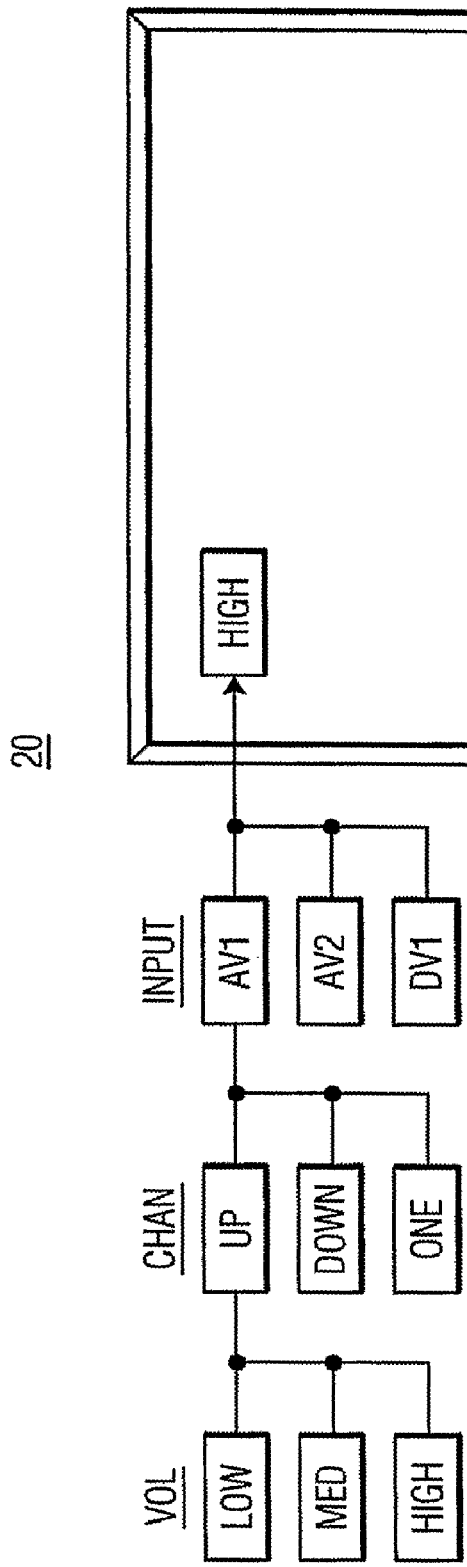
FIG. 5 is a diagram illustrating how different options may be displayed according to an exemplary embodiment of the present invention.

FIG. 5 is a diagram illustrating how different options may be displayed according to an exemplary embodiment of the present invention. As indicated in FIG. 5, each selectable mode includes a plurality of associated options. In particular, the volume selection mode includes low, medium and high options, the channel selection mode includes up, down and digit one options, and the input selection mode includes AV1, AV2 and DV1 options. The channel selection mode could also include channels stored in a favorite channel list. For each selectable mode, the associated options may be displayed in the sequence indicated in FIG. 5 as step 335 is repeated. For example, assuming the selected mode is the volume selection mode, a first option such as the low option may be displayed the first time step 335 is performed. Similarly, a second option such as the medium option may be displayed the second time step 335 is performed, a third option such as the high option may be displayed the third time step 335 is performed (as depicted in FIG. 5), and so on. These options may also be repeated in this sequence each time counter variable "k" is reset to its predetermined initial value at step 345. It is noted that the options shown in FIG. 5 are examples only, and other options for each mode may also be included according to the present invention.

Once the predetermined key of user input device 10 is pressed within the predetermined time period at step 340, the option currently being displayed in the window is deemed to be selected by a user and process flow advances to step 350 where processor 14 removes the window from the screen and causes the selected option to be executed. From step 350, process flow loops back to step 305 where the above-described method may be repeated.

Figure 6:
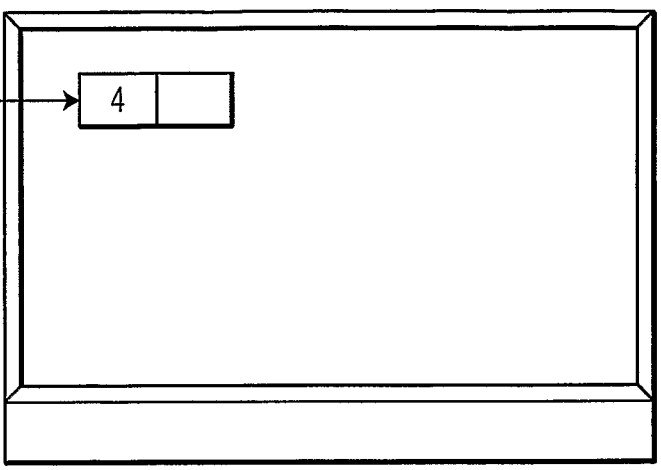
FIG. 6 is a diagram illustrating how a first channel digit may be selected according to an exemplary embodiment of the present invention.
Figure 7:
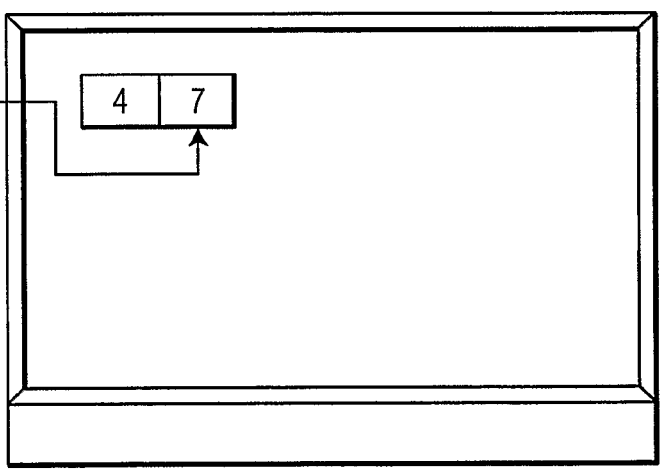
FIG. 7 is a diagram illustrating how a second channel digit may be selected according to an exemplary embodiment of the present invention.

According to another exemplary embodiment of the present invention, the principles of FIG. 3 may also be used to facilitate another type of channel selection which is depicted in FIGS. 6 and 7. Referring to FIG. 6, a diagram illustrating how a first channel digit may be selected according to this exemplary embodiment is shown. In FIG. 6, after the predetermined key of user input device 10 is initially pressed, a first channel digit is displayed and changes every predetermined time period (e.g., between 500 and 1000 milliseconds). In this manner, the first channel digit sequentially changes from 0 to 9 (and thereafter may start over again at 0) until a user selects a currently displayed channel digit by again pressing the predetermined key of user input device 10. Once a first channel digit is selected in FIG. 6 (i.e., the digit "4"), the selected digit freezes on the screen and a second channel digit appears to its right as indicated in FIG. 7. The second channel digit also sequentially changes from 0 to 9 (and thereafter may start over again at 0) until a user selects a currently displayed channel digit by again pressing the predetermined key of user input device 10. In this manner, a user may select channel digits by pressing the predetermined key of user input device 10 while those digits are displayed on the screen in the same manner as a mode and option may be selected in FIG. 3. It should be intuitive to those skilled in the art that the aforementioned channel selection technique can be extended to accommodate the selection of a third digit, and so on. The average time required to select a channel using this technique varies based on the number of digits selected, the number of options per digit (which is usually 10), and the time period that each digit is displayed before changing. For example, if there are 3 digits to be selected, and each digit is displayed 500 milliseconds before changing, then the average time needed to switch to another channel is: $(3)(10/2)(0.5)=7.5$ seconds. This time can be significantly reduced by only displaying channel numbers or identifiers from a personal list of favorite channels.

As described herein, the present invention provides a method for enabling users to control an electronic apparatus such as a television signal receiver, multimedia device, and/or other device in an easy and convenient manner using a single key of a user input device. The present invention may be applicable to various apparatuses, either with or without an integrated display device. Accordingly, the phrase "television signal receiver" as used herein may refer to systems or apparatuses including, but not limited to, television sets, computers or monitors that include an integrated display device, and systems or apparatuses such as set-top boxes, video cassette recorders (VCRs), digital versatile disk (DVD) players, video game boxes, personal video recorders (PVRs), computers or other apparatuses that may not include an integrated display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for controlling an electronic apparatus having a plurality of modes, said method comprising:
enabling each of said plurality of modes to be displayed one mode at a time for a first time period in sequence in response to a first occurrence of a control signal;
enabling one of said modes currently being displayed to be selected in response to a second occurrence of said control signal; and
enabling each of a plurality of options associated with said selected mode to be displayed one option at a time for a second time period in sequence in response to said second occurrence of said control signal.

2. The method of claim 1, further comprising:
enabling one of said options currently being displayed to be selected in response to a third occurrence of said control signal; and
executing said selected option in response to said third occurrence of said control signal.

3. The method of claim 2, wherein said control signal occurs in response to user input of a predetermined key of a user input device.

4. The method of claim 1, wherein said plurality of modes includes a volume selection mode, a channel selection mode, and an input selection mode.

5. The method of claim 1, wherein:
said plurality of modes are displayed in a first sequence and then repeated; and
said plurality of options are displayed in a second sequence and then repeated.

6. The method of claim 5, wherein if the second occurrence of said control signal is not received within the first time period after a mode has been displayed, an immediate next mode in the first sequence is displayed, and if the third occurrence of said control signal is not received within the second time period after an option has been displayed, an immediate next option in the second sequence is displayed.

7. The method of claim 1, wherein said plurality of modes and said plurality of options are each displayed in a window positioned in a corner of a screen.

8. The method of claim 1, wherein said first time period is equal to said second time period.

9. The method of claim 1, wherein said plurality of options includes channels stored in a favorite channel list.

10. An electronic apparatus, comprising:
memory means for storing data associated with a plurality of modes;
processing means for enabling each of said plurality of modes to be displayed one mode at a time for a first time period in sequence in response to a first occurrence of a control signal;
said processing means enabling one of said modes currently being displayed to be selected in response to a second occurrence of said control signal; and
said processing means enabling each of a plurality of options associated with said selected mode to be displayed one option at a time for a second time period in sequence in response to said second occurrence of said control signal.

11. The electronic apparatus of claim 10, wherein:
said processing means enables one of said options currently being displayed to be selected in response to a third occurrence of said control signal; and
said processing means executes said selected option in response to said third occurrence of said control signal.

12. The electronic apparatus of claim 11, wherein said control signal occurs in response to user input of a predetermined key of a user input device.

13. The electronic apparatus of claim 10, wherein said plurality of modes includes a volume selection mode, a channel selection mode, and an input selection mode.

14. The electronic apparatus of claim 10, wherein:
said plurality of modes are displayed in a first sequence and then repeated; and
said plurality of options are displayed in a second sequence and then repeated.

15. The electronic apparatus of claim 14, wherein if the second occurrence of said control signal is not received within the first time period after a mode has been displayed, an immediate next mode in the first sequence is displayed, and if the third occurrence of said control signal is not received within the second time period after an option has been displayed, an immediate next option in the second sequence is displayed.

16. The electronic apparatus of claim 10, wherein said plurality of modes and said plurality of options are each displayed in a window positioned in a corner of a screen.

17. The electronic apparatus of claim 10, wherein said first time period is equal to said second time period.

18. The electronic apparatus of claim 10, wherein said plurality of options includes channels stored in a favorite channel list.

19. A television signal receiver, comprising:
a memory operative to store data associated with a plurality of modes;
a processor operatively coupled to said memory, said processor enabling each of said plurality of modes to be displayed one mode at a time for a first time period in sequence in response to a first occurrence of a control signal;
said processor enabling one of said modes currently being displayed to be selected in response to a second occurrence of said control signal; and
said processor enabling each of a plurality of options associated with said selected mode to be displayed one option at a time for a second time period in sequence in response to said second occurrence of said control signal.

20. The television signal receiver of claim 19, wherein:
said processor enables one of said options currently being displayed to be selected in response to a third occurrence of said control signal; and
said processor executes said selected option in response to said third occurrence of said control signal.

21. The television signal receiver of claim 20, wherein said control signal occurs in response to user input of a predetermined key of a user input device (10).

22. The television signal receiver of claim 19, wherein said plurality of modes includes a volume selection mode, a channel selection mode, and an input selection mode.

23. The television signal receiver of claim 19, wherein:
said plurality of modes are displayed in a first sequence and then repeated; and
said plurality of options are displayed in a second sequence and then repeated.

24. The television signal apparatus of claim 23, wherein if the second occurrence of said control signal is not received within the first time period after a mode has been displayed, an immediate next mode in the first sequence is displayed, and if the third occurrence of said control signal is not received within the second time period after an option has been displayed, an immediate next option in the second sequence is displayed.

25. The television signal receiver of claim 19, wherein said plurality of modes and said plurality of options are each displayed in a window positioned in a corner of a screen.

26. The television signal receiver of claim 19, wherein said first time period is equal to said second time period.

27. The television signal receiver of claim 19, wherein said plurality of options includes channels stored in a favorite channel list.

* * * * *